US010494014B2

(12) United States Patent
Yamashita et al.

(10) Patent No.: US 10,494,014 B2
(45) Date of Patent: Dec. 3, 2019

(54) MOTOR INCLUDING NONMAGNETIC CONTAMINATION COVER AND ELECTRIC POWER STEERING DEVICE INCLUDING SAME

(71) Applicant: Nidec Corporation, Kyoto (JP)

(72) Inventors: Yoshiaki Yamashita, Kyoto (JP); Tomoyuki Kubota, Kyoto (JP)

(73) Assignee: Nidec Corporation, Kyoto (JP)

( * ) Notice: Subject to any disclaimer, the term of this patent is extended or adjusted under 35 U.S.C. 154(b) by 109 days.

(21) Appl. No.: 15/562,496

(22) PCT Filed: Mar. 29, 2016

(86) PCT No.: PCT/JP2016/060181
§ 371 (c)(1),
(2) Date: Sep. 28, 2017

(87) PCT Pub. No.: WO2016/158978
PCT Pub. Date: Oct. 6, 2016

(65) Prior Publication Data
US 2019/0077440 A1    Mar. 14, 2019

(30) Foreign Application Priority Data
Mar. 31, 2015  (JP) .................................. 2015-071367

(51) Int. Cl.
*H02K 11/30* (2016.01)
*B62D 5/04* (2006.01)
*H02K 5/10* (2006.01)
*H02K 3/52* (2006.01)
*H02K 5/22* (2006.01)
*H02K 11/215* (2016.01)
(Continued)

(52) U.S. Cl.
CPC ............ *B62D 5/0406* (2013.01); *H02K 3/522* (2013.01); *H02K 5/10* (2013.01); *H02K 5/225* (2013.01);
(Continued)

(58) Field of Classification Search
CPC .... H02K 11/30; H02K 11/215; H02K 11/022; H02K 29/08; H02K 3/522; H02K 5/10;
(Continued)

(56) References Cited

U.S. PATENT DOCUMENTS 9,676,408 B2    6/2017  Tominaga et al.
10,136,555 B2   11/2018 Kanazawa et al.
(Continued)

FOREIGN PATENT DOCUMENTS

JP    2002-218698 A    8/2002
JP    2008-148497 A    6/2008
(Continued)

OTHER PUBLICATIONS

Official Communication issued in International Patent Application No. PCT/JP2016/060181, dated Jun. 7, 2016.

*Primary Examiner* — Michael Andrews
(74) *Attorney, Agent, or Firm* — Keating & Bennett, LLP

(57) ABSTRACT

An aspect of a motor of the invention includes a rotor having a shaft, a stator, a bearing supporting the shaft, a cylindrical motor housing holding the stator and opening to one side, a bearing holder positioned on one side of the stator and holding the bearing, a control circuit board positioned on one side of the bearing holder, a rotation sensor attached to the control circuit board, a control circuit board housing positioned on one side of the motor housing and housing the control circuit board, a sensor magnet positioned closer to one side than the bearing and attached to the shaft, and a nonmagnetic contamination cover at least a part of which is positioned between the control circuit board and the bearing holder in the axial direction and which covers one side of the shaft, the bearing, and the sensor magnet.

12 Claims, 5 Drawing Sheets

(51) Int. Cl.
  *H02K 5/124*  (2006.01)
  *H02K 5/173*  (2006.01)
(52) U.S. Cl.
  CPC ............ *H02K 11/30* (2016.01); *H02K 5/124* (2013.01); *H02K 5/1732* (2013.01); *H02K 11/215* (2016.01)
(58) Field of Classification Search
  CPC ...... H02K 5/225; H02K 5/124; H02K 5/1732; H02K 2213/03; B62D 5/0406; B62D 5/07
  USPC ........................................ 310/10, 68 R, 68 B
  See application file for complete search history.

(56) References Cited

U.S. PATENT DOCUMENTS

| | | | |
|---|---|---|---|
| 2002/0079758 A1 | 6/2002 | Matsuyama et al. | |
| 2009/0072816 A1* | 3/2009 | Schrubbe ................ | G01D 5/06 324/207.2 |
| 2011/0181221 A1* | 7/2011 | Asahi ..................... | G01D 5/145 318/400.39 |
| 2013/0026888 A1* | 1/2013 | Migita ................... | H02K 29/08 310/68 B |
| 2016/0099623 A1* | 4/2016 | Bohm ..................... | H02K 3/28 310/43 |

FOREIGN PATENT DOCUMENTS

| | | | |
|---|---|---|---|
| JP | 2010-104213 A | 5/2010 | |
| JP | 2010-226907 A | 10/2010 | |
| JP | 2011-41359 A | 2/2011 | |
| JP | 2014-180170 A | 9/2014 | |

\* cited by examiner

MOTOR INCLUDING NONMAGNETIC CONTAMINATION COVER AND ELECTRIC POWER STEERING DEVICE INCLUDING SAME

BACKGROUND OF THE INVENTION

1. Field of the Invention

The present invention relates to a motor and an electric power steering device.

2. Description of the Related Art

In electric motors, a circuit board is disposed within a motor case in some cases (for example, Japanese Unexamined Patent Application Publication No. 2008-148497).

SUMMARY OF THE INVENTION

In the electric motor as described above, there is a concern that contamination existing within a motor body portion is attached to the circuit board and causes a conduction failure in a wiring provided in the circuit board.

An aspect of the invention is made in view of the above-described problem and an object of the invention is to provide a motor having a structure capable of suppressing attachment of contamination to a control circuit board, and an electric power steering device including such a motor.

Solution to Problem

An aspect of a motor of the invention includes a rotor which has a shaft centered on a center axis extending in an axial direction, a rotor core fixed to the shaft, and a rotor magnet fixed to the rotor core; a stator surrounding an outside of the rotor in a radial direction; a bearing positioned one side of the stator in the axial direction and supporting the shaft; a cylindrical motor housing holding the stator and opening to the one side; a bearing holder positioned on the one side of the stator and holding the bearing; a control circuit board positioned on the one side of the bearing holder; a rotation sensor attached to the control circuit board; a control circuit board housing positioned on the one side of the motor housing and housing the control circuit board; a sensor magnet positioned closer to the one side than the bearing and attached to the shaft; and a nonmagnetic contamination cover at least a part of which is positioned between the control circuit board and the bearing holder in the axial direction and which covers the one side of the shaft, the bearing, and the sensor magnet.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
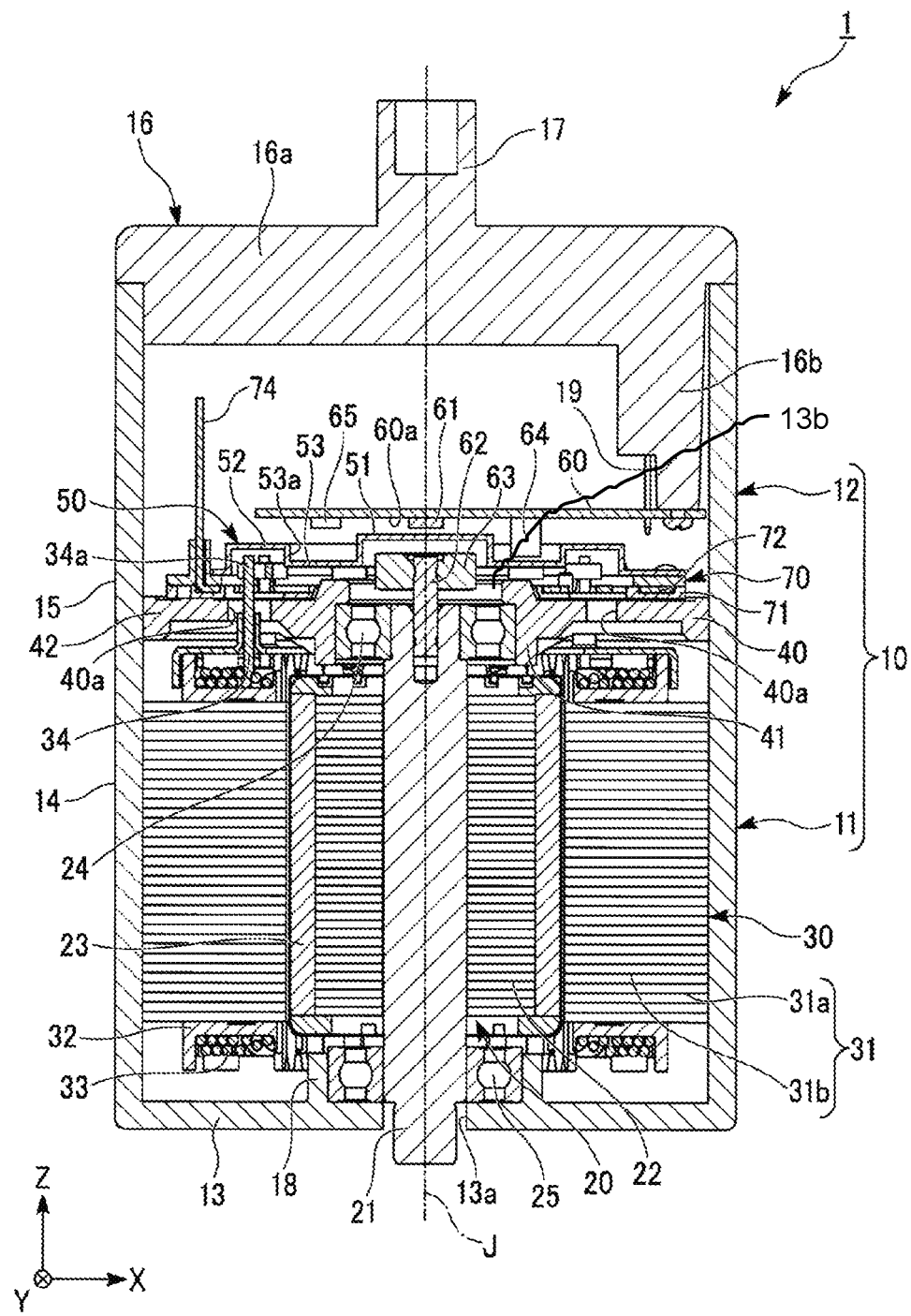
FIG. 1 is a sectional view illustrating a motor of an embodiment.

Hereinafter, a motor according to an illustrative embodiment of the invention will be described with reference to the drawings. The scope of the invention is not limited to the following embodiments and can be arbitrarily changed within the technical idea of the invention. In addition, in the following drawings, in order to make each configuration easy to understand, scales, numbers and the like in each structure may be made different from those in an actual structure.

In the drawings, an XYZ coordinate system is appropriately illustrated as a three-dimensional orthogonal coordinate system. In the XYZ coordinate system, a Z-axis direction is a direction parallel to an axial direction of a center axis J illustrated in FIG. 1. An X-axis direction is a direction orthogonal to the Z-axis direction and is a rightward and leftward direction of FIG. 1. A Y-axis direction is a direction orthogonal to both the X-axis direction and the Z-axis direction.

In the following description, a positive side (+Z side, one side) in the Z-axis direction is referred to as a "rear side" and a negative side (−Z side, the other side) in the Z-axis direction is referred to as a "front side". Moreover, the rear side and the front side are simply used for explanation and do not limit an actual positional relationship and direction. In addition, unless otherwise specified, a direction (Z-axis direction) parallel to the center axis J is simply referred to as an "axial direction", a radial direction with the center axis J as a center is simply referred to as a "radial direction", and a circumferential direction with the center axis J as the center, that is, the circumference of the center axis J is simply referred to as a "circumferential direction".

<Motor>

Figure 2:
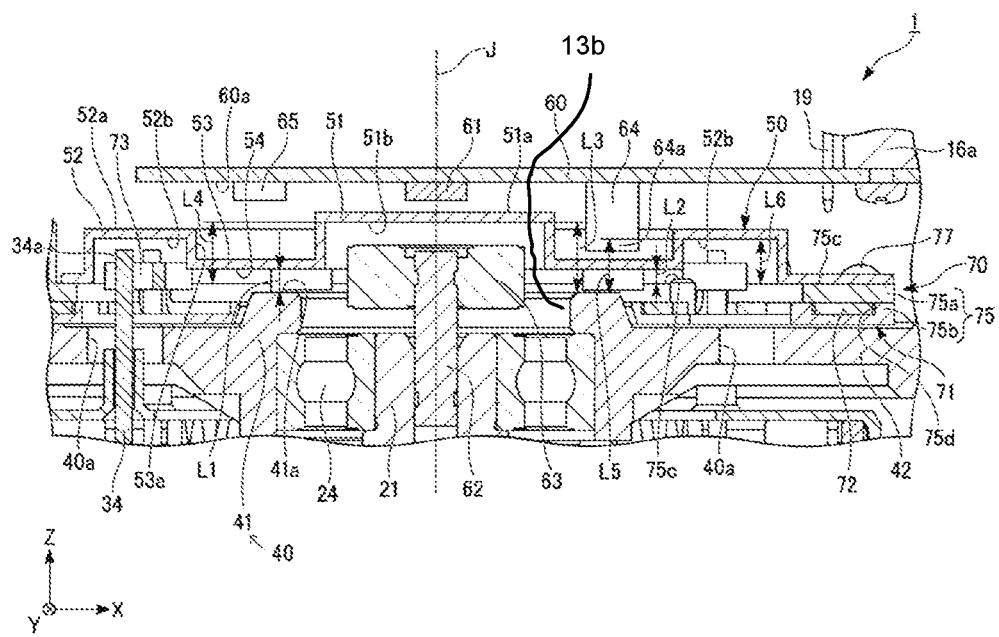
FIG. 2 is a sectional view illustrating a portion of the motor of the embodiment.
Figure 3:
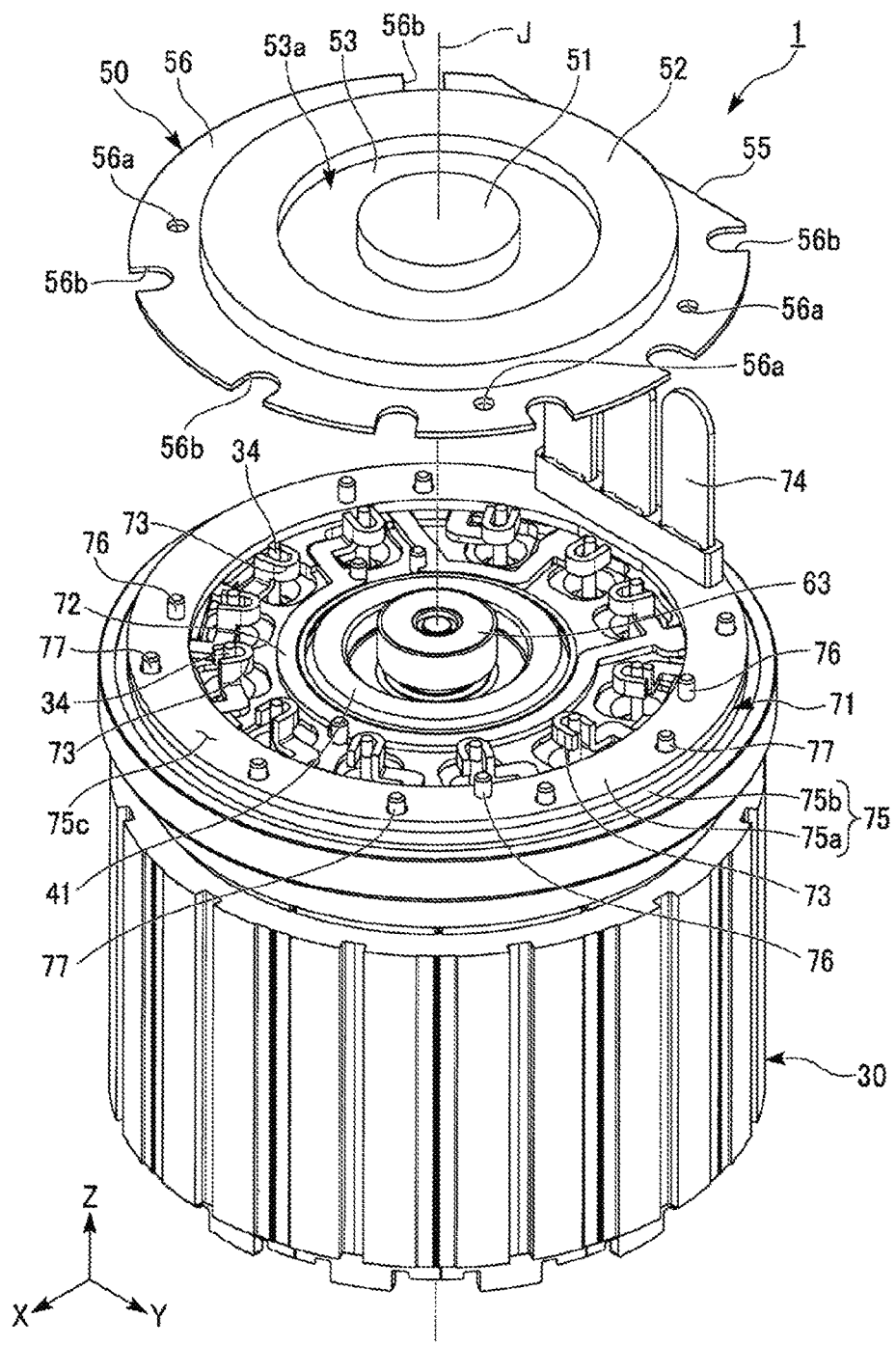
FIG. 3 is a perspective view illustrating another portion of the motor of the embodiment.
Figure 4:
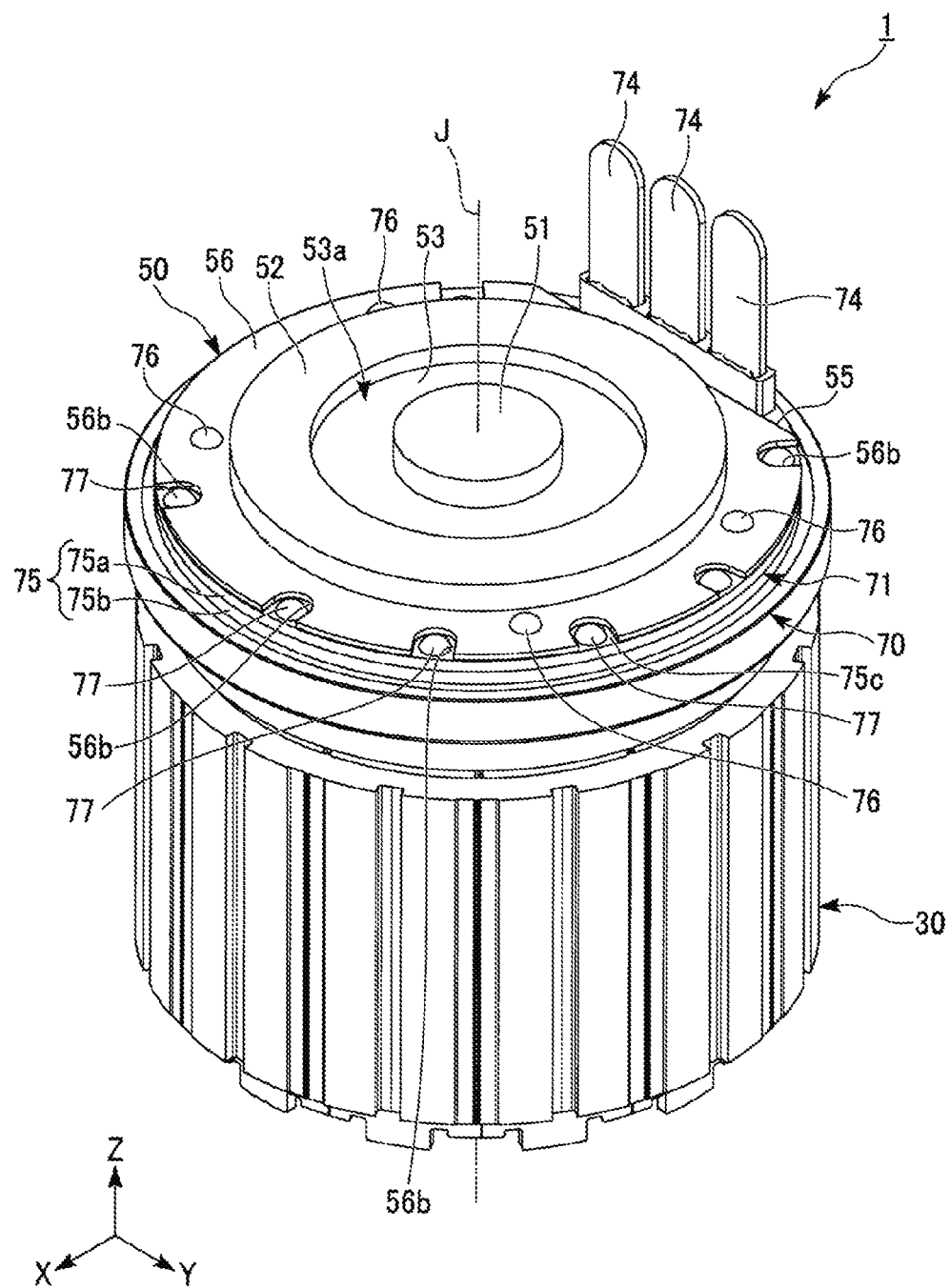
FIG. 4 is a perspective view illustrating the other portion of the motor of the embodiment.

FIG. 1 is a sectional view illustrating a motor 1 of the embodiment. FIG. 2 is a sectional view illustrating a portion of the motor 1 of the embodiment. FIGS. 3 and 4 are perspective views illustrating a portion of the motor 1 of the embodiment. In FIGS. 3 and 4, a housing 10, a control circuit board 60, or the like is omitted. FIG. 3 illustrates a state before a contamination cover 50 is attached.

As illustrated in FIG. 1, the motor 1 includes the housing 10, a rotor 20 having a shaft 21, a stator 30, a rear bearing 24, a front bearing 25, a sensor magnet 63, a bearing holder 40, a bus bar unit 70, the contamination cover 50, the control circuit board 60, a rotation sensor 61, and electronic components 64 and 65.

[Housing]

The housing 10 houses each portion of the motor 1 therein. The housing 10 includes a motor housing 11 and a control circuit board housing 12. That is, the motor 1 includes the motor housing 11 and the control circuit board housing 12.

The motor housing 11 is cylindrical and opens on the rear side (+Z side). The motor housing 11 includes a motor cylindrical portion 14, a bottom portion 13, and a front bearing holding portion 18. The motor cylindrical portion 14 is cylindrical and surrounds the outside of the stator 30 in the radial direction. In the embodiment, the motor cylindrical portion 14 is cylindrical. The stator 30 is fixed to an inner surface of the motor cylindrical portion 14. That is, the motor housing 11 holds the stator 30.

The bottom portion 13 is disposed at an end portion of the motor cylindrical portion 14 on the front side (−Z side). An output shaft hole portion 13a is disposed at the bottom portion 13. The output shaft hole portion 13a penetrates the bottom portion 13 in the axial direction (Z-axis direction). The front bearing holding portion 18 is disposed on a surface of the bottom portion 13 on the rear side (+Z side). The front bearing holding portion 18 holds the front bearing 25.

The control circuit board housing 12 is positioned on the rear side (+Z side) of the motor housing 11. The control circuit board housing 12 houses the control circuit board 60. The control circuit board housing 12 includes a control circuit board cylindrical portion 15 and a lid 16.

The control circuit board cylindrical portion 15 is cylindrical and surrounds the outside of the control circuit board 60 in the radial direction. In the embodiment, the control circuit board cylindrical portion 15 is cylindrical. The control circuit board cylindrical portion 15 is connected to the end portion of the motor cylindrical portion 14 on the rear side (+Z side). In the embodiment, the bottom portion 13, the motor cylindrical portion 14, and the control circuit board cylindrical portion 15 are a bottomed cylindrical single member opening on the rear side. Moreover, the bottom portion 13, the motor cylindrical portion 14, and the control circuit board cylindrical portion 15 may be separate members respectively.

The lid 16 closes an opening of the control circuit board cylindrical portion 15 on the rear side (+Z side). The lid 16 includes a lid body 16a, a support portion 16b, a wiring member 19, and a connector portion 17. The support portion 16b extends from the lid body 16a to the front side (−Z side). The support portion 16b is positioned on the inside of the control circuit board cylindrical portion 15 in the radial direction.

Moreover, the lid 16 and the control circuit board cylindrical portion 15 may be a single member. That is, the housing 10 may be a single member.

The wiring member 19 protrudes from the support portion 16b to the front side (−Z side). The wiring member 19 is electrically connected to the control circuit board 60. Although illustration is omitted, the wiring member 19 is routed to the connector portion 17 via the support portion 16b and the lid body 16a. The connector portion 17 extends from the lid body 16a to the rear side (+Z side). The connector portion 17 is connected to an external power supply (not illustrated). The wiring member 19 is electrically connected to the external power supply via the connector portion 17. Therefore, electric power can be supplied from the external power supply to the control circuit board 60 via the wiring member 19.

[Rotor]

The rotor 20 includes the shaft 21, a rotor core 22, and a rotor magnet 23. The shaft 21 is centered on the center axis J extending in the axial direction (Z-axis direction). The shaft 21 is supported so as to be rotatable around the center axis J by the front bearing 25 and the rear bearing 24. The end portion of the shaft 21 on the front side (−Z side) protrudes to the outside of the housing 10 via the output shaft hole portion 13a. The end surface of the shaft 21 on the rear side (+Z side) is provided with a hole. An attachment member 62 is fitted into the hole of the shaft 21. The attachment member 62 is a rod-like member and extends in the axial direction.

The shaft 21 is fixed to the rotor core 22. The rotor core 22 includes a through-hole penetrating in the axial direction. The shaft 21 penetrates the through-hole of the rotor core 22. In other words, the rotor core 22 surrounds the shaft 21 in the circumferential direction. The shaft 21 is preferably fixed to the through-hole of the rotor core 22 by press fitting. The rotor magnet 23 is fixed to the rotor core 22. More specifically, the rotor magnet 23 is fixed to an outer surface of the rotor core 22 along the circumferential direction. The rotor core 22 and the rotor magnet 23 rotate together with the shaft 21.

[Stator]

The stator 30 is substantially cylindrical with the center axis J as the center. The stator 30 surrounds the outside of the rotor 20 in the radial direction. The stator 30 includes a stator core 31, a bobbin 32, and a coil 33. The stator core 31 includes a core back portion 31a and a plurality of teeth portions 31b.

A shape of the core back portion 31a is cylindrical with the center axis J as the center. Each of the teeth portions 31b extends from the inner surface of the core back portion 31a to the shaft 21. The teeth portions 31b are disposed at equal intervals in the circumferential direction on the inner surface of the core back portion 31a. The bobbin 32 is mounted on each of the teeth portions 31b.

During energization, the coil 33 can excite the stator core 31. The coil 33 is disposed on the bobbin 32. More specifically, the coil 33 is configured by wiring a conductive wire around the bobbin 32. The coil 33 is connected to a coil wiring 34. At least a part of the coil wiring 34 is inserted into a hole portion 40a of the bearing holder 40 which is described later. An end portion 34a of the coil wiring 34 on the rear side (+Z side) is positioned closer to the rear side than the bearing holder 40. The coil wiring 34 may be an end portion of the conductive wire configuring the coil 33, or may be a member separate from the conductive wire configuring the coil 33.

[Rear Bearing and Front Bearing]

The rear bearing 24 is positioned on the rear side (+Z side) of the stator 30. The rear bearing 24 is held in the bearing holder 40. The front bearing 25 is positioned on the front side (−Z side) of the stator 30. The front bearing 25 is held in the front bearing holding portion 18 of the motor housing 11.

The rear bearing 24 and the front bearing 25 support the shaft 21 of the rotor 20. In the embodiment, the rear bearing 24 and the front bearing 25 are ball bearings. However, the types of the rear bearing 24 and the front bearing 25 are not particularly limited, and other types of bearings such as sliding bearings may be used.

[Sensor Magnet]

As illustrated in FIG. 2, the sensor magnet 63 is disposed closer to the rear side (+Z side) than the rear bearing 24. The sensor magnet 63 is disposed closer to the rear side than the bearing holder 40. As illustrated in FIG. 3, the sensor magnet 63 is annular. The attachment member 62 is fixed to the shaft 21. The shaft 21 is fitted into the through-hole of the attachment member 62. As illustrated in FIG. 2, the inner surface of the sensor magnet 63 is fitted into the outer surface of the attachment member 62. Therefore, the sensor magnet 63 is attached to the shaft 21.

The rotation sensor 61 detects a change in a magnetic pole position of the sensor magnet 63. In the embodiment, as the rotation sensor 61, a magneto-resistive element is used. The sensor magnet 63 is disposed on the rear side (+Z side) of the shaft 21. Therefore, the resolution of the rotation sensor 61 can be improved. As a result, responsiveness of the motor 1 can be improved.

[Bearing Holder]

As illustrated in FIG. 1, the bearing holder 40 is disposed on the rear side (+Z side) of the stator 30. The bearing holder 40 is fixed to the inner surface of the control circuit board cylindrical portion 15. In a plan view (XY plane view), the shape of the bearing holder 40 is preferably circular with the center axis J as the center. The bearing holder 40 is preferably made of metal. Moreover, in the plan view (XY plane view), the shape of the bearing holder 40 is not necessarily limited to the circular shape, but may be other shapes such as a polygonal shape.

The bearing holder 40 includes a holding portion 41 and an annular portion 42. The holding portion 41 is cylindrical with the center axis J as the center. The shaft 13 extends through a shaft hole portion 13b defined in the bearing holder 40. The holding portion 41 opens on both sides in the axial direction (Z-axis direction). The rear bearing 24 is fitted into the inside of the holding portion 41 in the radial direction. Therefore, the bearing holder 40 can hold the rear bearing 24.

The annular portion 42 surrounds the outside of the holding portion 41 in the radial direction. In the embodiment, the holding portion 41 and the annular portion 42 are a single member. The annular portion 42 includes a plurality of hole portions 40a penetrating the annular portion 42 in the axial direction (Z-axis direction). That is, the bearing holder 40 is provided with at least one hole portion 40a penetrating the bearing holder 40 in the axial direction.

[Bus Bar Unit]

The bus bar unit 70 is disposed on the rear side (+Z side) of the bearing holder 40. The bus bar unit 70 is disposed on a surface of the annular portion 42 of the bearing holder 40 on the rear side. The bus bar unit 70 includes a bus bar holder 71 and a bus bar 72.

The bus bar holder 71 holds the bus bar 72. The bus bar holder 71 is preferably made of resin. As illustrated in FIG. 3, the bus bar holder 71 includes a body portion 75, a first protrusion portion 76, and a second protrusion portion 77.

The body portion 75 includes a rear-side body portion 75a and a front-side body portion 75b. The rear-side body portion 75a and the front-side body portion 75b are preferably annular respectively. The rear-side body portion 75a and the front-side body portion 75b overlap each other in the axial direction (Z-axis direction). The rear-side body portion 75a is disposed on the rear side (+Z side) of the front-side body portion 75b.

A plurality of the through-holes penetrating the rear-side body portion 75a in the axial direction (Z-axis direction) are disposed in the rear-side body portion 75a. A plurality of the first protrusion portions 76 are disposed in a body portion rear surface 75c of the rear-side body portion 75a on the rear side (+Z side). The first protrusion portion 76 protrudes from the body portion rear surface 75c to the rear side. That is, the first protrusion portion 76 protrudes from the body portion 75 to the rear side.

A plurality of the second protrusion portions 77 are disposed on the rear side (+Z side) of the front-side body portion 75b. The second protrusion portion 77 protrudes from the surface of the front-side body portion 75b on the rear side to the rear side. The second protrusion portion 77 protrudes rearward than the body portion rear surface 75c via the through-hole disposed in the rear-side body portion 75a.

As illustrated in FIG. 4, an end portion of the second protrusion portion 77 on the rear side (+Z side) is welded to the body portion rear surface 75c. Therefore, the rear-side body portion 75a is fixed to the front-side body portion 75b.

As illustrated in FIG. 3, an inserted hole portion 56a is disposed in a flange portion 56 of the contamination cover 50. The first protrusion portion 76 passes through the inserted hole portion 56a. As illustrated in FIG. 4, the end portion of the first protrusion portion 76 on the rear side (+Z side) is disposed closer to the rear side than the flange portion 56. The end portion of the first protrusion portion 76 on the rear side is welded to the surface of the flange portion 56 on the rear side. Therefore, the rear-side body portion 75a is fixed to the contamination cover 50 and the bus bar holder 71 is fixed to the contamination cover 50.

A groove 75d is disposed on the surface of the front-side body portion 75b on the rear side (+Z side). As illustrated in FIG. 2, a part of the bus bar 72 is fitted into the groove 75d. A part of the bus bar 72 fitted into the groove 75d is fixed to the rear side of the front-side body portion 75b to overlap the rear-side body portion 75a. Therefore, a part of the bus bar 72 fitted into the groove 75d is held in the bus bar holder 71. That is, the bus bar holder 71 holds the bus bar 72.

As illustrated in FIG. 3, the bus bar 72 has at least one coil connection terminal 73. The bus bar 72 includes a plurality of coil connection terminals 73. The coil connection terminal 73 is disposed on the inside of the body portion 75 in the radial direction. In the plan view (XY plane view), the shape of the coil connection terminal 73 is a U shape opening on the outside in the radial direction. The front-side body portion 75b and the bearing holder 40 have through-holes into which the coil wiring 34 is inserted. The coil connection terminal 73 is electrically connected to the coil wiring 34. That is, the bus bar 72 is electrically connected to the coil wiring 34. The coil wiring 34 is disposed between portions facing the coil connection terminal 73. The coil connection terminals 73 adjacent to each other are crushed in a direction sandwiching the coil wiring 34 by a welding jig, and the coil connection terminal 73 and the coil wiring 34 are connected. Moreover, a method of connecting the coil connection terminal 73 and the coil wiring 34 is not limited to the method described above and is not particularly limited.

As illustrated in FIG. 4, the bus bar 72 includes at least one external connection terminal 74. That is, the bus bar unit 70 includes at least one external connection terminal 74. In FIG. 4, the bus bar unit 70 (that is, the bus bar 72) includes three external connection terminals 74. The external connection terminal 74 extends in the axial direction (Z-axis direction). The external connection terminal 74 extends closer to the rear side (+Z side) than the contamination cover 50 via a notch portion 55 which is described below of the contamination cover 50.

Although illustration is omitted, the external connection terminal 74 is electrically connected to the external power supply (not illustrated). That is, the bus bar 72 is electrically connected to the external power supply. Therefore, a current can flow through the stator 30 via the bus bar 72 and the coil wiring 34.

[Contamination Cover]

As illustrated in FIG. 2, the contamination cover 50 is disposed between the control circuit board 60 and the bearing holder 40 in the axial direction (Z-axis direction). As described above, the contamination cover 50 is fixed to the bus bar holder 71.

The contamination cover 50 is made of a nonmagnetic material. The material of the contamination cover 50 is preferably resin. As illustrated in FIG. 4, the contamination cover 50 includes a first convex portion 51, an annular plate portion 53, a second convex portion 52, and the flange portion 56.

As illustrated in FIG. 2, the first convex portion 51 is a hollow portion that is convex on the rear side (+Z side). The first convex portion 51 opens on the front side (−Z side). As illustrated in FIG. 4, the first convex portion 51 is cylindrical with the center axis J as the center.

As illustrated in FIG. 1, the first convex portion 51 covers the rear side (+Z side) of the shaft 21 and the sensor magnet 63. That is, the contamination cover 50 covers the rear side of the shaft 21 and the sensor magnet 63. The first convex portion 51 covers a part of the rear bearing 24 on the rear side.

As illustrated in FIG. 2, a part of the sensor magnet 63 is housed on the inside of the first convex portion 51. In a case where the rotor 20 rotates together with the sensor magnet 63 and contamination attached to the sensor magnet 63 scatters, the contamination is attached to the inside of the first convex portion 51. The contamination is, for example, dust, scrap, magnetic powder, iron powder, or the like. Therefore, it is possible to suppress that the contamination of the sensor magnet 63 is diffused into the inside of the motor 1.

The annular plate portion 53 is a plate-like portion and extends from the end portion of the first convex portion 51 on the front side (−Z side) to the outside in the radial direction. As illustrated in FIG. 4, in the plan view (XY plane view), the annular plate portion 53 is annular with the center axis J as the center. As illustrated in FIG. 2, the annular plate portion 53 covers a part of the rear bearing 24 on the rear side (+Z side). The annular plate portion 53 and the first convex portion 51 cover an entirety of the rear bearing 24 on the rear side. That is, the contamination cover 50 covers the rear side of the rear bearing 24.

According to the embodiment, the contamination cover 50 is disposed between the control circuit board 60 and the bearing holder 40 in the axial direction (Z-axis direction). The contamination cover 50 covers the rear side (+Z side) of the shaft 21, the rear bearing 24, and the sensor magnet 63. Therefore, the contamination existing at a gap between the rear bearing 24 and the shaft 21, and the contamination attached from the sensor magnet 63 are blocked by the contamination cover 50 and can be prevented from attaching to the control circuit board 60. Therefore, the motor of the embodiment has a structure that can suppress attachment of contamination to the control circuit board 60.

Moreover, contamination going out to the rear side from the gap between the rear bearing 24 and the shaft 21 is, for example, contamination existing between the shaft 21 and the rotor core 22. In addition, the contamination generated from the sensor magnet 63 is, for example, iron powder or the like attached to the sensor magnet 63.

The second convex portion 52 is a hollow portion that is convex to the rear side (+Z side). The second convex portion 52 is disposed on the outside of the first convex portion 51 in the radial direction. The second convex portion 52 opens to the front side (−Z side). As illustrated in FIG. 4, the second convex portion 52 is annular. The second convex portion 52 is preferably annular with the center axis J as the center.

As illustrated in FIG. 2, the second convex portion 52 covers the rear side (+Z side) of the hole portion 40a of the bearing holder 40. That is, the contamination cover 50 covers the rear side of the hole portion 40a of the bearing holder 40. Therefore, even in a case where the contamination attached to the stator 30 scatters to the rear side of the bearing holder 40 via the hole portion 40a through which the coil wiring 34 passes, attachment of the contamination generated from the stator 30 to the control circuit board 60 can be suppressed.

The second convex portion 52 covers the rear side (+Z side) of the coil wiring 34. The second convex portion 52 covers the rear side of the coil connection terminal 73. That is, the contamination cover 50 covers the rear side of the coil connection terminal 73. Therefore, even in a case where the motor 1 has the bus bar unit 70, attachment of the contamination entering the rear side of the bearing holder 40 via the hole portion 40a to the control circuit board 60 can be suppressed.

The second convex portion 52 covers the rear side (+Z side) of the plurality of coil connection terminals 73. Therefore, in a case where the plurality of coil connection terminals 73 are provided, it is possible to reduce the number of the second convex portions 52. Therefore, it is possible to simplify the configuration of the contamination cover 50. In the embodiment, the second convex portion 52 covers the rear side of all the coil connection terminals 73.

The second convex portion 52 includes a second cover rear surface 52a positioned on the rear side (+Z side). The first convex portion 51 includes a first cover rear surface 51a positioned on the rear side. The second cover rear surface 52a is positioned closer to the front side (−Z side) than the first cover rear surface 51a. That is, an end portion of the second convex portion 52 on the rear side is positioned closer to the front side than an end portion of the first convex portion 51 on the rear side. Therefore, it is possible to widen a space of the second convex portion 52 on the rear side. Therefore, it is possible to suppress that a component attached to the control circuit board 60 is in contact with the contamination cover 50.

A part of the coil connection terminal 73 is housed on the inside of the second convex portion 52. Therefore, in the second convex portion 52, the position of the second cover rear surface 52a in the axial direction (Z-axis direction) can be disposed on the front side (−Z side). Therefore, it is possible to further widen the space of the second convex portion 52 on the rear side. Contamination entering the rear side (+Z side) of the bearing holder 40 from the hole portion 40a can be attached to the inside of the second convex portion 52. Therefore, the contamination scattering the inside of the motor 1 can be suppressed.

A concave portion 53a is disposed between the first convex portion 51 and the second convex portion 52 in the radial direction. That is, the contamination cover 50 includes the concave portion 53a positioned between the first convex portion 51 and the second convex portion 52 in the radial direction. The concave portion 53a is concave on the front side (−Z side). As illustrated in FIG. 4, in the plan view (XY plane view), an outer shape the concave portion 53a is annular with the center axis J as the center. The concave portion 53a is a surface of the rear side (+Z side) of the annular plate portion 53. Since the contamination cover 50 has the concave portion 53a, it is possible to further widen the space of the contamination cover 50 on the rear side (+Z side).

The first convex portion 51 includes a first inner surface 51b that is a surface on the rear side (+Z side) in the inside of the first convex portion 51. The second convex portion 52 has a second inner surface 52b that is a surface on the rear side on the inside of the second convex portion 52. As illustrated in FIG. 2, in the surfaces of the contamination cover 50 on the front side (−Z side), the surface positioned between the first convex portion 51 and the second convex portion 52 in the radial direction is positioned closer to the front side than the first inner surface 51b and the second inner surface 52b.

In the surfaces of the contamination cover 50 on the front side (−Z side), the surface positioned between the first convex portion 51 and the second convex portion 52 in the radial direction is an annular-plate portion front surface 54 of the annular plate portion 53 on the front side. That is, the annular-plate portion front surface 54 is positioned closer to the front side (−Z side) than the first inner surface 51b and the second inner surface 52b.

Therefore, between the first convex portion 51 and the second convex portion 52 in the radial direction, it is possible to reduce the gap between the contamination cover 50 and the bearing holder 40 in the axial direction (Z-axis direction). In addition, between the first convex portion 51 and the second convex portion 52 in the radial direction, it is also possible to reduce the gap between the contamination cover 50 and the bus bar unit 70 in the axial direction (Z-axis direction). Therefore, the contamination attached to the sensor magnet 63 and the contamination existing between the shaft 21 and the rear bearing 24 moving to a second convex portion 52 side can be suppressed. Therefore, the contamination scattering the inside of the motor 1 can be suppressed.

The bearing holder 40 includes a holder rear surface 41a positioned on the rear side (+Z side) of the bearing holder 40. A distance between the annular-plate portion front surface 54 and the holder rear surface 41a in the axial direction (Z-axis direction) is a distance L1. A distance between the annular-plate portion front surface 54 and the surface of the bus bar holder 71 on the rear side in the axial direction is a distance L2. More specifically, the distance between the annular-plate portion front surface 54 and the body portion rear surface 75c of the rear-side body portion 75a on the rear side in the axial direction is the distance L2. Moreover, in the embodiment, the holder rear surface 41a is an end surface of the holding portion 41 on the rear side.

A distance between the first inner surface 51b of the first convex portion 51 and the holder rear surface 41a in the axial direction (Z-axis direction) is a distance L3. A distance between the first inner surface 51b and the body portion rear surface 75c in the axial direction is a distance L4. A distance between the second inner surface 52b and the holder rear surface 41a in the axial direction is a distance L5. A distance between the second inner surface 52b and the body portion rear surface 75c in the axial direction is a distance L6.

The distance L1 is smaller than the distance L3, the distance L4, the distance L5, and the distance L6. The distance L2 is smaller than the distance L3, the distance L4, the distance L5, and the distance L6. That is, the distance between the annular-plate portion front surface 54 and the holder rear surface 41a, or the distance between the annular-plate portion front surface 54 and the body portion rear surface 75c is smaller than the distance between the first inner surface 51b and the second inner surface 52b, and the holder rear surface 41a, or the body portion rear surface 75c.

Therefore, between the first convex portion 51 and the second convex portion 52 in the radial direction, it is possible to further reduce the gap between the contamination cover 50 and the bearing holder 40 and the bus bar unit 70 in the axial direction. Therefore, the contamination scattering the inside of the motor 1 can be suppressed.

In the embodiment, the distance L2 is smaller than the distance L1. The distance L1 and the distance L2 are preferably equal to or smaller than the magnitude of contamination generated in a driving portion of the motor 1. Therefore, the contamination scattering the inside of the motor 1 can be suppressed. Moreover, the contamination generated in the driving portion of the motor 1 is, for example, contamination going out from the gap between the stator 30 and the sensor magnet 63, and the shaft 21 and the rear bearing 24.

The flange portion 56 extends from the end portion on the front side (−Z side) to the outside in the radial direction at an edge portion on the outside of the second convex portion 52 in the radial direction. The surface of the flange portion 56 on the front side is in contact with the body portion rear surface 75c of the body portion 75. As illustrated in FIG. 3, in the embodiment, the flange portion 56 has a shape in which a part of an annulus concentric with the center axis J is cut out.

The notch portion 55 is disposed in the flange portion 56. That is, the contamination cover 50 includes the notch portion 55. The notch portion 55 is, for example, a portion cut out along the Y-axis direction. As illustrated in FIG. 4, the external connection terminal 74 of the bus bar 72 extends closer to the rear side (+Z side) than the contamination cover 50 via the notch portion 55. Therefore, while the contamination cover 50 has a simple configuration, the external connection terminal 74 can be drawn out to the rear side of the contamination cover 50.

As illustrated in FIG. 3, the flange portion 56 is provided with the inserted hole portion 56a and an inserted notch portion 56b. The inserted hole portion 56a and the inserted notch portion 56b are positioned closer to the outside than the second convex portion 52 in the radial direction. As illustrated in FIG. 4, at least a part of the first protrusion portion 76 is inserted into the inserted hole portion 56a. At least a part of the second protrusion portion 77 is inserted into the inserted notch portion 56b. That is, the contamination cover 50 includes the inserted portion that is a hole or a notch into which at least a part of the protrusion portion is inserted in the bus bar holder 71. Therefore, the contamination cover 50 can be aligned to the bus bar holder 71 in the circumferential direction.

When viewed in the axial direction (Z-axis direction), the entirety of the second protrusion portion 77 is positioned on the inside of the inserted notch portion 56b. Therefore, the surface of the flange portion 56 on the front side (−Z side) is in contact with the body portion rear surface 75c and the contamination cover 50 can be fixed to the bus bar holder 71. Therefore, the space of the contamination cover 50 on the front side can be easily sealed.

In the embodiment, the contamination cover 50 covers the entirety of the bus bar 72 on the rear side (+Z side) by the first convex portion 51, the second convex portion 52, the annular plate portion 53, and the flange portion 56.

In the embodiment, the space of the inside of the housing 10 is partitioned in the axial direction by the contamination cover 50, the bus bar unit 70, and the bearing holder 40. In the partitioned space of the inside of the housing 10, a space positioned on the front side (−Z side) of the contamination cover 50 is, for example, sealed. That is, the driving portion of the motor 1 is sealed within the space on the front side of the inside of the housing 10. That is, the contamination cover 50 covers the through-hole through which the front-side body portion 75b and the coil wiring 34 of the bearing holder 40 pass, so that in the inside space of the housing 10, a space positioned on the front side (−Z side) of the contamination cover 50 is sealed. The driving portion of the motor 1 includes, for example, the rotor 20, the stator 30, the rear bearing 24, the front bearing 25, and the sensor magnet 63.

Therefore, the contamination generated from the driving portion of the motor 1 can be prevented from moving to a space positioned on the rear side (+Z side) of the contamination cover in the space on the inside of the partitioned housing 10. Therefore, according to the embodiment, the contamination generated in the driving portion of the motor 1 can be prevented from attaching to the control circuit board 60.

Here, in the present specification, the "space is sealed" includes the contamination existing within the sealed space does not leak out of the space. That is, in the present specification, the "sealed space" includes a case where a gap connecting a space and the outside of the space is provided as long as contamination can be confined in the space.

[Control Circuit board]

As illustrated in FIG. 1, the control circuit board 60 is positioned on the rear side (+Z side) of the bearing holder 40. The control circuit board 60 is positioned on the rear side (+Z side) of the contamination cover 50. In the embodiment, a circuit board surface of the control circuit board 60 is perpendicular to the axial direction (Z-axis direction). The circuit board surface of the control circuit board 60 is, for example, a control circuit board front surface 60a the control circuit board 60 on the front side (−Z side). Moreover, the circuit board surface of the control circuit board 60 is not necessarily perpendicular to the axial direction.

The control circuit board 60 is fixed to the support portion 16b of the control circuit board housing 12. In FIG. 1, the control circuit board 60 is fixed to the control circuit board housing 12 with screws. Moreover, the method of fixing the control circuit board 60 is not particularly limited and another method may be used. Although illustration is omitted, the circuit board surface of the control circuit board 60 is provided with a print wiring.

For example, in a case of a configuration in which the shaft 21 penetrates the control circuit board 60, it is difficult to provide a cover for blocking contamination attached to the control circuit board 60. Furthermore, since a gap is formed between the shaft 21 and the control circuit board 60 in the radial direction, the contamination cannot be sufficiently blocked by the cover.

On the other hand, the control circuit board 60 of the embodiment is positioned on the rear side (+Z side) of the shaft 21. Therefore, it is possible to simplify the configuration of the contamination cover 50 that blocks the contamination attached to the control circuit board 60. In addition, the contamination cover 50 can easily block the contamination.

[Rotation Sensor and Electronic Component]

As illustrated in FIG. 2, the rotation sensor 61 is attached to the control circuit board 60. More specifically, the rotation sensor 61 is attached to the control circuit board front surface 60a. The rotation sensor 61 faces the sensor magnet 63 in the axial direction (Z-axis direction) via the contamination cover 50. The rotation sensor 61 detects the rotation of the sensor magnet 63. In the embodiment, the rotation sensor 61 is a magneto-resistive element. However, the rotation sensor 61 is not limited to the magneto-resistive element and may be, for example, a Hall element.

The electronic components 64 and 65 are attached to the control circuit board 60. More specifically, the electronic components 64 and 65 are attached to the control circuit board front surface 60a. The electronic components 64 and 65 are relatively large components among components attached to the control circuit board 60. The electronic components 64 and 65 are, for example, electrolytic capacitors, choke coils, or the like.

The electronic components 64 and 65 face the concave portion 53a of the contamination cover 50 in the axial direction (Z-axis direction). Therefore, even in a case where a dimensional error occurs in the contamination cover 50, the control circuit board 60, or the like, the electronic components 64 and 65 can be prevented from being in contact with the contamination cover 50.

An end portion 64a of the electronic component 64 on the front side (−Z side) is housed within the concave portion 53a. Therefore, the control circuit board 60 can easily be close to the contamination cover 50 in the axial direction and it is possible to reduce the dimension of the entirety of the motor 1 in the axial direction (Z-axis direction). In addition, the rotation sensor 61 can easily be close to the sensor magnet 63 in the axial direction. Therefore, the detection accuracy of the rotation sensor 61 can be improved.

Moreover, in the embodiment, the configuration is not limited to the above configuration.

For example, in the embodiment, at least a part of the contamination cover 50 may be positioned between the control circuit board 60 and the bearing holder 40 in the axial direction. That is, in the embodiment, for example, a part of the contamination cover 50 may be positioned closer to the rear side than the control circuit board 60, or may be positioned closer to the front side than the bearing holder 40.

In addition, in the embodiment, the contamination cover 50 may cover at least the rear side of the shaft 21, the rear bearing 24, and the sensor magnet 63. That is, in the embodiment, the contamination cover 50 may not cover, for example, the rear side of both or one of the hole portion 40a of the bearing holder 40 and the coil connection terminal 73.

In addition, in the embodiment, at least a part of the sensor magnet 63 may be housed on the inside of the first convex portion 51. That is, in the embodiment, the entirety of the sensor magnet 63 may be housed on the inside of the first convex portion 51.

In addition, in the embodiment, at least a part of the coil connection terminal 73 may be housed on the inside of the second convex portion 52. That is, in the embodiment, the entirety of the coil connection terminal 73 may be housed on the inside of the second convex portion 52.

In addition, in the embodiment, the second convex portion 52 may be provided for each coil connection terminal 73. In this case, the rear side of one coil connection terminal 73 is covered by one second convex portion 52.

In addition, in the embodiment, the end portion 64a of the electronic component 64 on the front side may not be housed in the concave portion 53a. In addition, in the embodiment, the electronic components 64 and 65 may face, for example, the first convex portion 51 or the second convex portion 52 in the axial direction.

In addition, in the embodiment, the sensor magnet 63 may be fitted and fixed to an outer peripheral surface of the shaft 21. In this case, the position of the end surface of the sensor magnet 63 on the rear side in the axial direction may be the same as the position of the end surface of the shaft 21 on the rear side in the axial direction. In the configuration, as the rotation sensor 61, for example, the Hall element is preferably used.

In addition, in the embodiment, the bus bar holder 71 may be a single member. In this case, the bus bar unit 70 can be manufactured, for example, by insert molding for inserting the bus bar 72. In addition, in this case, the second protrusion portion 77 and the inserted notch portion 56b of the contamination cover 50 may not be provided.

In addition, in the embodiment, a bearing may be provided only on the rear side of the stator 30 and the shaft 21 may be supported in a cantilever manner.

In addition, in the embodiment, the control circuit board 60 may not be fixed to the housing 10. In this case, for example, a support portion extending from the contamination cover 50 to the rear side may be provided and the control circuit board 60 may be supported on the support portion.

In addition, in the embodiment, a part of the bearing holder 40 may be positioned closer to the rear side than the sensor magnet 63.

<Electric Power Steering Device>

Figure 5:
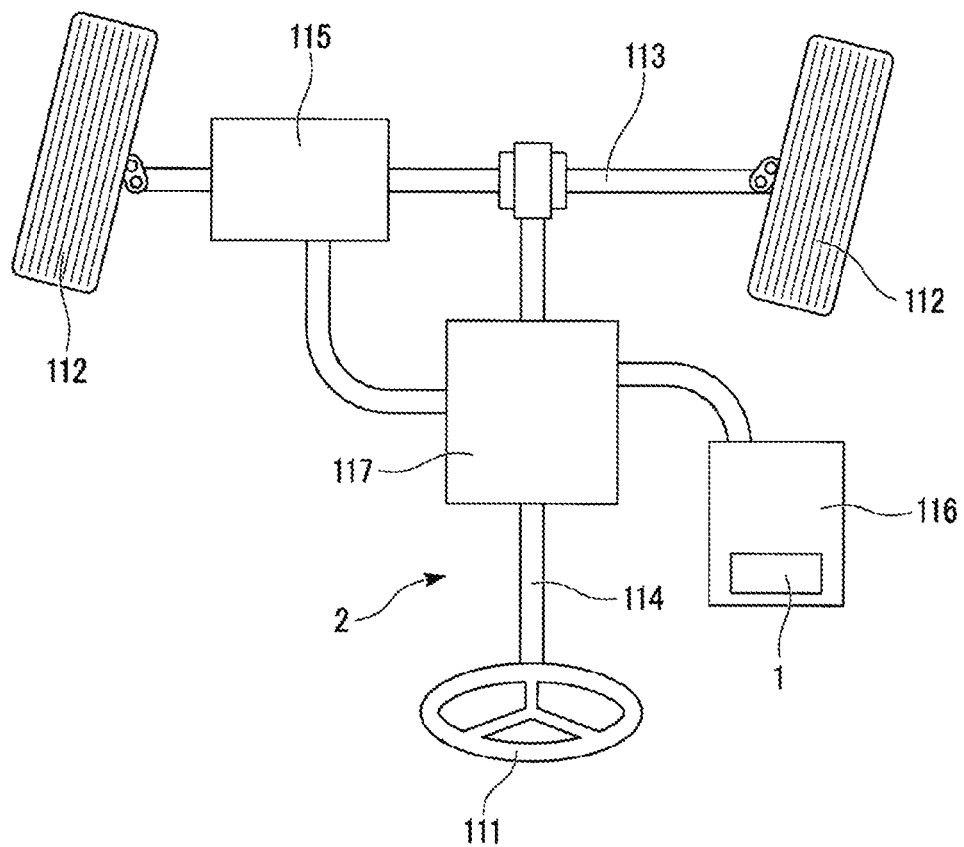
FIG. 5 is a schematic view illustrating an electric power steering device of the embodiment.

Next, an embodiment of a device mounting the motor 1 of the embodiment will be described. In the embodiment, an example in which the motor 1 is mounted on an electric power steering device will be described. FIG. 5 is a schematic view illustrating an electric power steering device 2 of the embodiment.

The electric power steering device 2 is mounted on a steering mechanism of a wheel of an automobile. The electric power steering device 2 is a device that reduces a steering force by a hydraulic pressure. As illustrated in FIG. 5, the electric power steering device 2 of the embodiment includes the motor 1, a steering shaft 114, an oil pump 116, and a control valve 117.

The steering shaft 114 transmits an input from a steering wheel 111 to an axle 113 having wheels 112. The oil pump 116 generates the hydraulic pressure in a power cylinder 115 that transmits a hydraulic driving force to the axle 113. The control valve 117 controls oil of the oil pump 116. In the electric power steering device 2, the motor 1 is mounted as a driving source of the oil pump 116.

Since the electric power steering device 2 includes the motor 1 of the embodiment, attachment of contamination to the control circuit board 60 of the motor 1 can be suppressed. Therefore, reliability of the electric power steering device 2 can be enhanced.

Moreover, each of the above-described configurations can be appropriately combined within a range not inconsistent with each other.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A motor comprising:
a rotor which includes a shaft centered on a center axis extending in an axial direction, a rotor core fixed to the shaft, and a rotor magnet fixed to the rotor core, the axial direction extending from a first end of the motor to a second end of the motor;
a stator surrounding an outside of the rotor in a radial direction;
a bearing positioned on one side of the stator that faces the first end of the motor in the axial direction and supporting the shaft;
a cylindrical motor housing holding the stator and opening to the one side;
a bearing holder positioned on the one side of the stator, holding the bearing, and including a shaft hole that penetrates through a bottom portion of the bearing holder;
a control circuit board positioned on one side of the bearing holder that faces the first end of the motor in the axial direction;
a rotation sensor attached to the control circuit board;
a control circuit board housing positioned on one side of the motor housing that faces the first end of the motor in the axial direction and housing the control circuit board;
a sensor magnet positioned closer to the first end of the motor than the bearing is, the sensor magnet being attached to the shaft; and
a nonmagnetic contamination cover at least a part of which is positioned between the control circuit board and the bearing holder in the axial direction and which covers the shaft, the bearing, the shaft hole, and the sensor magnet; wherein
the stator includes a stator core and a coil exciting the stator core,
the bearing holder is provided with a hole portion penetrating the bearing holder in the axial direction,
the coil is connected to a coil wiring or a conductive member, at least a portion of the coil wiring or the conductive member is inserted into the hole portion,
an end portion of the coil wiring the conductive member on the first end of the motor is positioned closer to the first end of the motor than the bearing holder is, and
the contamination cover covers the one side of the hole portion.

2. The motor according to claim 1, further comprising:
a bus bar unit positioned the one side of the bearing holder,
wherein the bus bar unit includes
a bus bar electrically connected to the coil wiring or the conductive member, and
a bus bar holder holding the bus bar,
wherein the bus bar includes a coil connection terminal electrically connected to the coil wiring or the conductive member, and
wherein the contamination cover covers one side of the coil connection terminal that faces the first end of the motor in the axial direction.

3. The motor according to claim 2, wherein
the contamination cover includes:
a first hollow convex portion that is convex on the one side,
a second hollow convex portion positioned on an outside of the first convex portion in a radial direction and is convex on one side that faces the first end of the motor in the axial direction, and
a concave portion positioned between the first convex portion and the second convex portion in the radial direction, and is concave on another side that faces the second end of the motor in the axial direction,
the first convex portion and the second convex portion open to the another side,
at least a portion of the sensor magnet is housed on an inside of the first convex portion, and
at least a portion of the coil connection terminal is housed on an inside of the second convex portion.

4. The motor according to claim 3,
wherein an end portion of the second convex portion on the one side of the second convex portion is positioned closer to the another side than an end portion of the first convex portion on one side that faces the first end of the motor in the axial direction.

5. The motor according to claim 3, wherein
in surfaces of the contamination cover on another side that faces the second end of the motor in the axial direction,
a cover surface positioned between the first convex portion and the second convex portion in the radial direction is positioned closer to the another side than a first inner surface on one side of the contamination cover that faces the first end of the motor in the axial direction on the inside of the first convex portion and a second inner surface of the one side of the contamination cover on the inside of the second convex portion, and wherein a distance between the cover surface and a surface of the bearing holder on the one side of the bearing holder or a surface of the bus bar holder on one side of the bus bar holder that faces the first end of the motor in the axial direction is shorter than a distance between the first inner surface and the second inner surface, and the surface of the bearing holder on the one side of the bearing holder or the surface of the bus bar holder on the one side of the bus bar holder.

6. The motor according to claim 3, wherein a plurality of the coil connection terminals are provided, wherein the second convex portion is annular, and wherein the second convex portion covers the one side of the plurality of the coil connection terminals.

7. The motor according to claim 3, further comprising:

an electronic component attached to the control circuit board, wherein the electronic component faces the concave portion in the axial direction.

8. The motor according to claim 7, wherein an end portion of the electronic component on another side that faces the second end of the motor in the axial direction is housed on the inside of the concave portion.

9. The motor according to claim 3, wherein the bus bar holder includes a body portion and a protrusion portion protruding from the body portion to the one side, wherein the contamination cover includes an inserted portion that is a hole or a notch into which at least a portion of the protrusion portion is inserted, and wherein the inserted portion is positioned closer to the outside than the second convex portion in the radial direction.

10. The motor according to claim 2, wherein the contamination cover includes a notch portion, wherein the bus bar unit includes an external connection terminal, and wherein the external connection terminal extends closer to the first end of the motor than the contamination cover is via the notch portion.

11. The motor according to claim 1, wherein the sensor magnet is positioned on one side of the shaft in the axial direction from an end face of the shaft.

12. An electric power steering device comprising:

the motor according to claim 1.

* * * * *